US007559564B2

(12) United States Patent
Takimoto

(10) Patent No.: US 7,559,564 B2
(45) Date of Patent: Jul. 14, 2009

(54) OUTWARDLY DEPLOYING AIRBAG SYSTEM

(75) Inventor: Takayuki Takimoto, Hikone (JP)

(73) Assignee: Takata Corporation, Tokyo (JP)

( * ) Notice: Subject to any disclaimer, the term of this patent is extended or adjusted under 35 U.S.C. 154(b) by 283 days.

(21) Appl. No.: 11/242,755

(22) Filed: Oct. 4, 2005

(65) Prior Publication Data
US 2006/0091661 A1 May 4, 2006

(30) Foreign Application Priority Data
Oct. 27, 2004 (JP) ............................. 2004-312621

(51) Int. Cl.
*B60K 28/10* (2006.01)
(52) U.S. Cl. ........................ 280/274; 280/738; 280/741; 280/742
(58) Field of Classification Search ............. 280/730.1, 280/730.2, 731, 732, 733, 734, 735, 736, 280/742, 738; 180/274
See application file for complete search history.

(56) References Cited

U.S. PATENT DOCUMENTS

| 3,773,352 | A | * | 11/1973 | Radke | ..................... | 280/731 |
|---|---|---|---|---|---|---|
| 5,626,359 | A | * | 5/1997 | Steffens et al. | ............. | 280/735 |
| 5,658,010 | A | * | 8/1997 | Steffens et al. | ............. | 280/731 |
| 5,722,686 | A | * | 3/1998 | Blackburn et al. | .......... | 280/735 |
| 5,769,452 | A | * | 6/1998 | Yoshida | ...................... | 280/735 |
| 5,964,478 | A | * | 10/1999 | Stanley et al. | ............... | 280/735 |
| 6,019,389 | A | * | 2/2000 | Burgi et al. | ................. | 280/736 |
| 6,032,979 | A | * | 3/2000 | Mossi et al. | ................ | 280/741 |
| 6,364,553 | B1 | * | 4/2002 | McCue et al. | ............... | 400/625 |
| 6,702,323 | B2 | * | 3/2004 | Goetz | .......................... | 280/736 |
| 6,860,510 | B2 | * | 3/2005 | Ogawa et al. | ............... | 280/736 |
| 6,883,631 | B2 | * | 4/2005 | Hu et al. | ..................... | 180/274 |
| 7,044,502 | B2 | * | 5/2006 | Trevillyan et al. | ........... | 280/741 |
| 2002/0005636 | A1 | * | 1/2002 | McFarland et al. | .......... | 280/736 |

(Continued)

FOREIGN PATENT DOCUMENTS

DE 100 62 560 A1 7/2001

(Continued)

OTHER PUBLICATIONS

A search report dated Mar. 26, 2007, from the European Patent Office in corresponding European Application No. 05020685.3-2421.

*Primary Examiner*—Toan C To
(74) *Attorney, Agent, or Firm*—Fitch, Even, Tabin & Flannery

(57) ABSTRACT

An outwardly deploying airbag system can maintain the internal pressure of an airbag for a required period without vainly increasing the maximum internal pressure of the airbag during inflation. When a sensor detects a collision with a pedestrian, an inflator performs a first gas injection step. An airbag is thereby deployed into a final deployment shape. Subsequently, when the internal pressure of the airbag falls to a predetermined pressure because of leakage of gas through vent holes, and a sensor predicts or detects a collision with a pedestrian, the inflator performs a second gas injection step. Consequently, the internal pressure of the airbag remains high for a long period, and the airbag sufficiently absorbs an impact whenever the pedestrian hits the airbag. The pressure and amount of gas injected in the first gas injection step can be made smaller than in related art, and the required airbag strength is reduced.

10 Claims, 2 Drawing Sheets

U.S. PATENT DOCUMENTS

| | | |
|---|---|---|
| 2003/0057686 A1* | 3/2003 | Goetz .................... 280/736 |
| 2003/0159875 A1 | 8/2003 | Sato et al. |
| 2005/0029781 A1* | 2/2005 | Enders et al. ............ 280/732 |
| 2005/0057030 A1* | 3/2005 | Fischer et al. ........... 280/743.2 |

FOREIGN PATENT DOCUMENTS

| | | |
|---|---|---|
| DE | 201 19 580 U1 | 5/2002 |
| DE | 101 02 597 A1 | 9/2002 |
| DE | 102 39 352 A1 | 3/2004 |
| JP | 07246908 | 9/1995 |
| JP | 08230610 | 9/1996 |
| JP | 08258668 | 10/1996 |
| JP | 08276816 | 10/1996 |
| JP | 09030368 | 2/1997 |
| JP | 2000 264146 | 9/2000 |
| JP | 2001 315599 | 11/2001 |
| JP | 2001 322518 | 11/2001 |
| JP | 2001 334895 | 12/2001 |
| JP | 2002 308028 | 10/2002 |
| JP | 2003 063334 | 3/2003 |
| JP | 2003 312405 | 11/2003 |

* cited by examiner

OUTWARDLY DEPLOYING AIRBAG SYSTEM

FIELD OF THE INVENTION

The present invention relates to an outwardly deploying airbag system that protects a pedestrian, or a passenger of a bicycle or a motorcycle (hereinafter also referred to as a pedestrian or the like) when a vehicle collides with, for example, the pedestrian, the bicycle, or the motorcycle during driving.

BACKGROUND OF THE INVENTION

Outwardly deploying airbag systems have been developed as pedestrian-protecting airbag systems that prevent a pedestrian or the like from directly hitting, for example, a wind shield by deploying an airbag along an outer surface of a vehicle body in order to protect the pedestrian or the like when a moving vehicle collides with, for example, the pedestrian, a bicycle, or a motorcycle.

When the internal pressure of an outwardly deploying airbag inflated along the outer surface of the vehicle body is excessively high or excessively low, an impact on the pedestrian or the like cannot be reduced sufficiently.

Japanese Unexamined Patent Application Publication No. 8-276816 describes an outwardly deploying airbag system in which the internal pressure of an airbag increases as the speed of a car increases. This publication also discloses a mechanism that increases the inflation internal pressure of the airbag by reducing the internal capacity of the airbag, and discloses that the internal pressure of the airbag is decreased by inhibiting a part of gas from an inflator from being filled in the airbag.

It is known that vent holes are provided in an airbag of an outwardly deploying airbag system, as is described in, for example, Japanese Unexamined Patent Application Publication No. 2001-315599.

The airbag described in Japanese Unexamined Patent Application Publication No. 8-276816 does not have a vent hole, and the internal pressure of the inflated airbag is kept high for a relatively long period. In this type of airbag, gas does not leak from the vent hole when a pedestrian or the like hits the airbag, and therefore, a sufficient impact absorption property is not necessarily ensured.

When the airbag is provided with a vent hole, gas leaks from the airbag through the vent hole. Therefore, it is preferable to increase the output of the inflator in expectation of gas leakage. In this case, however, the maximum internal pressure of the inflated airbag vainly increases. Consequently, an impact on the pedestrian or the like cannot be sufficiently reduced, and, for example, the sewing cost and base-cloth cost of the airbag are increased.

SUMMARY OF THE INVENTION

An object of the present invention is to provide an outwardly deploying airbag system that can maintain the internal pressure of an airbag for a required period without vainly increasing the maximum internal pressure of the airbag during inflation.

An outwardly deploying airbag system according to the present invention includes an airbag deployable along an outer surface of an automobile, and a gas generating means for inflating the airbag. The gas generating means generates gas at a plurality of different times.

In an outwardly deploying airbag system in one form, the airbag has a vent means through which the gas leaks from the interior of the airbag to absorb an impact.

In an outwardly deploying airbag system in another form, the gas generating means performs a first gas generation step to inflate the airbag, and performs a second gas generation step when the internal pressure of the airbag falls to a predetermined pressure after reaching the maximum value.

In the outwardly deploying airbag system of the present invention, since the gas generating means generates gas at a plurality of different times, the internal pressure of the airbag can be kept high for a required period. It is also possible to limit the amount of gas generated by the gas generating means in one step, and to lower the maximum internal pressure of the inflated airbag. Consequently, an impact on the pedestrian or the like can be reduced sufficiently, and the production cost of the airbag can be reduced.

The present invention is suitably applied to a case in which there is a vent means through which gas leaks from the airbag. When the vent means, such as a vent hole, is provided, gas partly leaks from the airbag and the maximum internal pressure of the airbag is decreased, before a pedestrian or the like hits the airbag. According to the present invention, by performing the second and subsequent gas generation steps after the airbag is inflated, the gas leaking through the vent means is compensated for, and the internal pressure of the airbag can be kept high for a long period.

In the present invention, the airbag is inflated in the first gas generation step, and the second gas generation step is performed when the internal pressure of the airbag falls to a predetermined pressure after reaching the maximum value. Therefore, an impact on the pedestrian or the like can be absorbed quite sufficiently.

DETAILED DESCRIPTION OF THE PREFERRED EMBODIMENTS

Figure 1A:
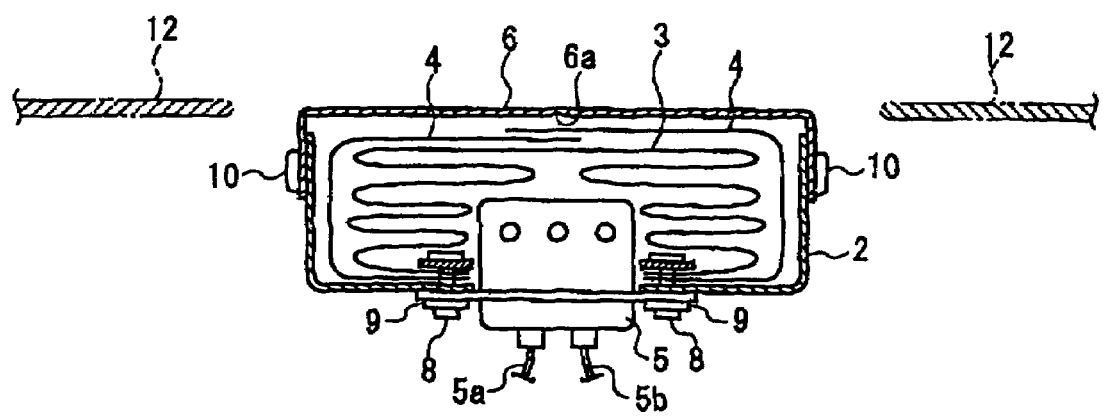
FIGS. 1(a) and (b) are cross-sectional views of an outwardly deploying airbag system according to an embodiment before and after an inflator operates.
Figure 1B:
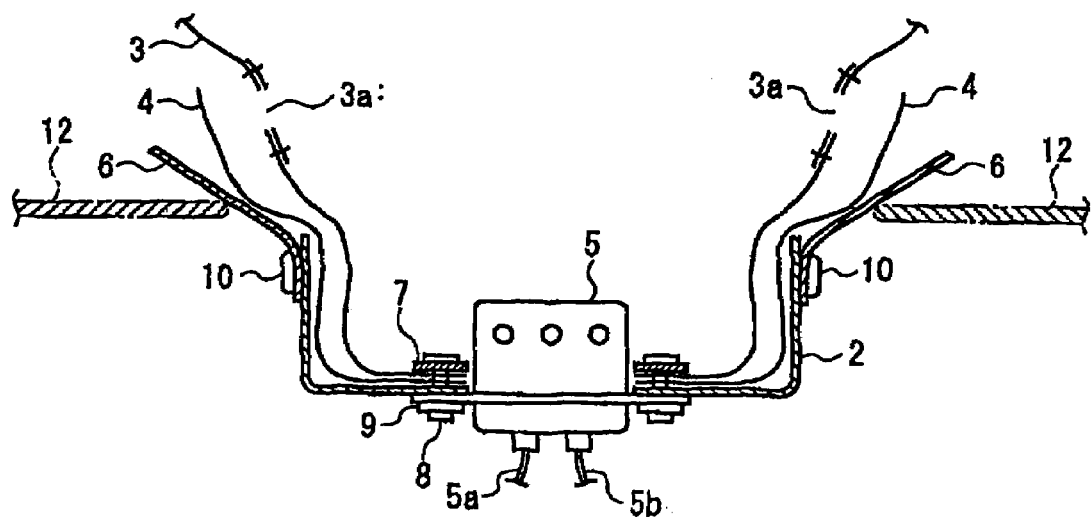

An embodiment of the present invention will be described below with reference to the drawings. FIGS. 1(a) and 1(b) are cross-sectional views of an outwardly deploying airbag system according to the embodiment, respectively, showing a state before an airbag is inflated and a state after the airbag is inflated.

An outwardly deploying airbag system 1 includes a container-shaped retainer (airbag holding member) 2 serving as a case having an upper opening, an airbag 3 placed inside the retainer 2 in a folded manner, a protection cloth 4 that covers the folded airbag 3, an inflator 5 for inflating the airbag 3, and a lid (cover member) 6 that covers the upper opening of the retainer 2.

The inflator 5 is of a multistage type that injects gas in two steps, and two pairs of ignition harnesses 5a and 5b are connected thereto. The airbag 3 has vent holes 3a.

A tear line 6a formed of a groove is provided on a back surface of the lid 6. In a case in which the airbag 3 is inflated, when a pressing force stronger than a predetermined force is applied to the back surface of the lid 6 by the inflation pressure of the airbag 3, the lid 6 is torn along the tear line 6a, and starts to open outward.

The airbag 3 and the protection cloth 4 are attached to the retainer 2 by ring retainers 7, bolts 8, and nuts 9. The inflator 5 is also attached to the retainer 2 by the bolts 8 and the nuts 9. A gas injecting portion at the head of the inflator 5 is placed inside the airbag 3. The lid 6 is attached to the retainer 2 by rivets 10.

In the outwardly deploying airbag system 1 having this configuration, when at least one of a collision predicting sensor and a collision detection sensor predicts or detects a collision with, for example, a pedestrian or the like, the inflator 5 is caused to inject gas in a first step, and the airbag 3 is inflated by the gas from the inflator 5.

When the airbag 3 starts inflation, the lid 6 is torn along the tear line 6a by the inflation pressure of the airbag 3, and the airbag 3 is deployed along an outer surface 12 of a vehicle body, as shown in FIG. 1(b).

Figure 2:
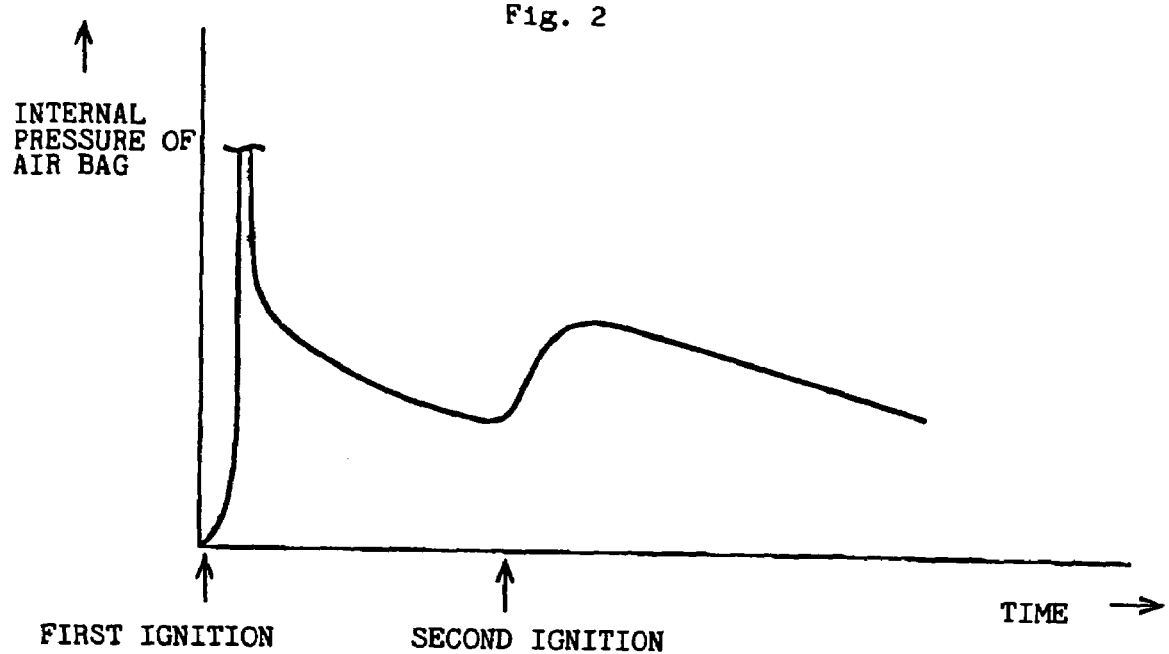
FIG. 2 is a graph showing the change of the internal pressure of an airbag with time in the outwardly deploying airbag system shown in FIG. 1.

In this embodiment, the inflator 5 injects gas in two steps. When a collision with a pedestrian or the like is detected, the inflator 5 injects gas in the first step, as described above. Consequently, the airbag 3 is inflated and deployed into a final deployment shape. When the airbag 3 takes the final deployment shape, the internal pressure of the airbag 3 becomes the highest, as shown in FIG. 2. Subsequently, the internal pressure of the airbag 3 gradually decreases as the gas in the airbag 3 leaks through the vent holes 3a.

In this embodiment, the inflator 5 is caused to inject gas in the second step when the internal pressure of the airbag 3 falls to a predetermined pressure (for example, when approximately 70 msec to 120 msec passes from the beginning of the first gas injection step). The internal pressure of the airbag 3 is thereby increased again, as shown in FIG. 2. After the second gas injection step is completed, the internal pressure of the airbag 3 gradually decreases again.

By performing the second gas injection step, the internal pressure of the airbag 3 can be kept high for a long period, and an impact can be sufficiently absorbed at any time point when a pedestrian or the like hits the airbag 3.

In the outwardly deploying airbag system, the internal pressure of the airbag is kept high for a long period by the second gas injection step, and it is satisfactory as long as the pressure and amount of the gas injected in the first step can deploy the airbag 3 into the final deployment shape within a predetermined period. For this reason, in the outwardly deploying airbag system 1, the maximum internal pressure obtained when the airbag 3 is inflated into the final deployment shape is lower than before. Therefore, an impact on a pedestrian or the like can be sufficiently reduced, the strength of a base cloth of the airbag 3 and the required strength of a joint portion, such as a sewn portion, can be reduced, and the production cost of the airbag 3 can be reduced.

While the inflator 5 injects gas in two steps in this embodiment, it may inject gas in three or more steps.

Figure 3:
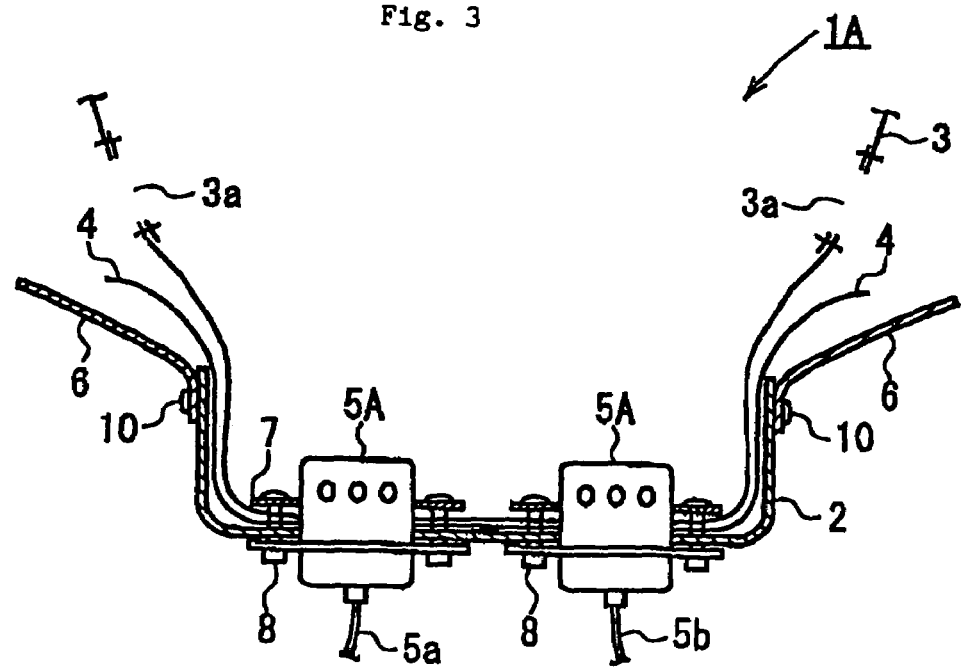
FIG. 3 is a cross-sectional view of an outwardly deploying airbag system according to another embodiment when an inflator operates.

In the present invention, instead of using the multistage inflator, a plurality of inflators 5A and 5B may be provided as in an outwardly deploying airbag system 1A shown in FIG. 3, and the internal pressure may be kept high for a long period by igniting the inflators 5A and 5B at different time points.

In the present invention, gas may leak through sewing stitches of the airbag 3, instead leaking through the vent holes of the airbag 3. Alternatively, gas may leak through a breathable base cloth that forms the airbag.

What is claimed is:

1. In combination, an airbag system and a vehicle, the combination comprising:
    an airbag mounted to the vehicle to be deployed along an external, outer surface thereof for protecting a pedestrian involved in a collision with the vehicle;
    gas leak structure of the airbag for leaking gas out from the air bag; and
    at least one inflator that injects inflation gas into the airbag in different stages during deployment of the airbag along the vehicle outer surface with an initial stage generating a maximum internal pressure in the airbag, and a subsequent stage that is initiated upon reaching a predetermined low internal pressure in the airbag due to gas leakage out therefrom and which causes pressure to increase in the airbag above the low pressure to an intermediate internal pressure lower than the maximum pressure with airbag internal pressure then falling from the intermediate pressure due to gas leaking out of the airbag.

2. The airbag system of claim 1, wherein the at least one inflator injects inflation gas in the initial stage with the airbag being inflated to a predetermined, final deployment shape, and the subsequent stage a predetermined time after initiation of the initial stage.

3. The airbag system of claim 1, wherein the airbag gas leak means for leaking gas out from the airbag allows injection of inflation gas by the at least one inflator in the different stages to develop the maximum pressure in the airbag so that the maximum pressure is kept to a minimum for reducing impact forces with the airbag.

4. The airbag system of claim 1, wherein the airbag gas leak means for leaking gas out from the airbag allows injection of inflation gas by the at least one inflator in the different stages to keep pressure in the airbag in a predetermined range for providing cushioned impact therewith.

5. The airbag system of claim 1, wherein the airbag internal pressure is maintained above the predetermined minimum pressure for a maximized time period by the injection of inflation gas in the different stages by the at least one inflator.

6. The airbag system of claim 1, wherein the at least one inflator comprises a single, multi-stage inflator or a plurality of inflators.

7. An airbag system comprising:
    an airbag; and
    at least one inflator for performing first and second gas injection steps with the second step being initiated upon internal pressure in the airbag falling from a maximum internal pressure generated by the first gas injection step to a predetermined low internal pressure with the second step increasing internal pressure from the low pressure to a level that is below maximum internal pressure,
    wherein the airbag has gas leak means for leaking gas out from the airbag so that a maximum pressure developed in the airbag is kept to a level that provides an optimum cushioned impact therewith.

8. An airbag system comprising:
    an airbag; and
    at least one inflator for performing first and second gas injection steps with the second step being initiated upon internal pressure in the airbag falling from a maximum internal pressure generated by the first gas injection step to a predetermined low internal pressure with the second step increasing internal pressure from the low pressure to a level that is below maximum internal pressure, wherein the airbag has gas leak means for leaking gas out from the airbag so that the gas injection steps are operable to keep pressure in the airbag in a predetermined range sufficient for absorbing impact therewith.

9. An airbag system comprising:

an airbag; and at least one inflator for performing first and second gas injection steps with the second step being initiated upon internal pressure in the airbag falling from a maximum internal pressure generated by the first gas injection step to a predetermined low internal pressure with the second step increasing internal pressure from the low pressure to a level that is below maximum internal pressure, wherein the at least one inflator is operable to initiate the second gas injection step approximately 70 msec to approximately 120 msec after initiation of the first gas injection step.

10. An airbag system comprising:

an airbag; and at least one inflator for performing first and second gas injection steps with the second step being initiated upon internal pressure in the airbag falling from a maximum internal pressure generated by the first gas injection step to a predetermined low internal pressure with the second step increasing internal pressure from the low pressure to a level that is below maximum internal pressure, wherein the airbag has one of vent holes, stitches and breathable cloth for leaking gas therefrom.

* * * * *